United States Patent
Kato et al.

(10) Patent No.: US 9,884,582 B2
(45) Date of Patent: Feb. 6, 2018

(54) LIGHTING DEVICE AND VEHICLE LIGHTING SYSTEM WITH SAME

(71) Applicant: Panasonic Intellectual Property Management Co., Ltd., Osaka (JP)

(72) Inventors: Kazuya Kato, Osaka (JP); Toshiaki Nakamura, Osaka (JP); Akihiro Kishimoto, Osaka (JP); Kenichi Fukuda, Osaka (JP); Masaaki Takamatsu, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/479,411

(22) Filed: Apr. 5, 2017

(65) Prior Publication Data

US 2017/0305328 A1    Oct. 26, 2017

(30) Foreign Application Priority Data

Apr. 26, 2016    (JP) ................ 2016-088591

(51) Int. Cl.
| | |
|---|---|
| H05B 33/08 | (2006.01) |
| B60Q 1/04 | (2006.01) |
| B60Q 1/42 | (2006.01) |
| B60Q 1/14 | (2006.01) |
| F21S 8/10 | (2006.01) |
| F21Y 115/10 | (2016.01) |

(52) U.S. Cl.
CPC ........... *B60Q 1/143* (2013.01); *H05B 33/089* (2013.01); *H05B 33/0854* (2013.01); *F21S 48/115* (2013.01); *F21S 48/1225* (2013.01); *F21S 48/1305* (2013.01); *F21Y 2115/10* (2016.08)

(58) Field of Classification Search
None
See application file for complete search history.

(56) References Cited

U.S. PATENT DOCUMENTS

| | | | |
|---|---|---|---|
| 2004/0178737 A1* | 9/2004 | Takeda ................ | B60Q 1/00 315/77 |
| 2009/0167187 A1* | 7/2009 | Kitagawa ........... | H05B 33/0854 315/77 |

FOREIGN PATENT DOCUMENTS

JP    2009-154748 A    7/2009

* cited by examiner

*Primary Examiner* — Dedei K Hammond
(74) *Attorney, Agent, or Firm* — Renner, Otto, Boisselle & Sklar, LLP

(57) ABSTRACT

A lighting device includes a thermal sensor, power converter circuits and a control circuit. The thermal sensor is configured to measure an internal temperature of a case. The power converter circuits are housed in the case and configured to be connected with different types of light sources, respectively. The control circuit is housed in the case and has priorities that are provided with respect to the different types of light sources according to their respective types. The control circuit is configured to, when the internal temperature is greater than a threshold, control the respective outputs of the power converter circuits so as to preferentially decrease an output for a light source corresponding to a first priority.

19 Claims, 4 Drawing Sheets

LIGHTING DEVICE AND VEHICLE LIGHTING SYSTEM WITH SAME

CROSS REFERENCE TO RELATED APPLICATION

This application claims the benefit and priority of Japanese Patent Application No. 2016-088591, filed on Apr. 26, 2016, the entire contents of which is incorporated herein by reference.

TECHNICAL FIELD

The disclosure relates to lighting devices and vehicle lighting systems with the same and, more particularly, to a multiple output lighting device configured to light different types of light sources, and a vehicle lighting system with the same.

BACKGROUND ART

There has been proposed a related lighting control device that includes switching regulators that supply semiconductor light sources with their respective driving currents, a thermal sensor and a control means (see e.g., Document 1 (JP 2009-154748 A)).

In the lighting control device, a priority, for decreasing the respective driving currents when a temperature detected with the thermal sensor is greater than or equal to a specified temperature, is set to each semiconductor light source. When a temperature detected with the thermal sensor is greater than or equal to the specified temperature, the control means decreases the respective driving currents in order of priority (in order from a semiconductor light source with a higher priority). Here, the priorities are determined according to thermal environmental information containing information on durability and heating values of the light sources.

In the lighting control device of Document 1, since the priorities are determined according to the thermal environmental information, a rather high priority may be set to a semiconductor light source with a low heat resistance even if it is a semiconductor light source (a light source) having a high importance degree of application. In this case, when a temperature detected with the thermal sensor is greater than or equal to the specified temperature, the control means may decrease a driving current to be supplied to the semiconductor light source having a high importance degree of application and the low heat resistance in preference to a driving current to be supplied to a semiconductor light source having a low importance degree of application and a high heat resistance.

SUMMARY OF THE INVENTION

It is an object of the present invention to provide a lighting device capable of decreasing, during a high temperature, respective outputs (output levels) with respect to light sources according to priorities corresponding to respective types of the light sources, and a vehicle lighting system with the same.

A lighting device according to an aspect of the present disclosure includes a thermal sensor, power converter circuits and a control circuit. The thermal sensor is configured to measure an internal temperature of a case. The power converter circuits are housed in the case and configured to be connected with different types of light sources, respectively. The control circuit is housed in the case and configured to control respective outputs (output levels) of the power converter circuits. The control circuit has priorities (priority levels) that are provided to the different types of light sources according to their respective types. The control circuit is configured to, when the internal temperature measured with the thermal sensor is greater than a threshold, control the respective outputs of the power converter circuits so as to preferentially decrease an output with respect to a light source, which corresponds to a first priority, of the different types of light sources.

A vehicle lighting system according to an aspect of the present disclosure includes the lighting device, the different types of light sources to be lit by the lighting device, and a housing that holds the lighting device and at least part of the different types of light sources and is configured to be attached to a vehicle.

BRIEF DESCRIPTION OF THE DRAWINGS

The figures depict one or more implementations in accordance with the present teaching, by way of example only, not by way of limitation. In the figures, like reference numerals refer to the same or similar elements where.

DETAILED DESCRIPTION

Embodiments to be explained below are just examples of a lighting device and a vehicle lighting system with the same, in accordance with the present disclosure.

Embodiment 1

(1) Schema

Figure 1:
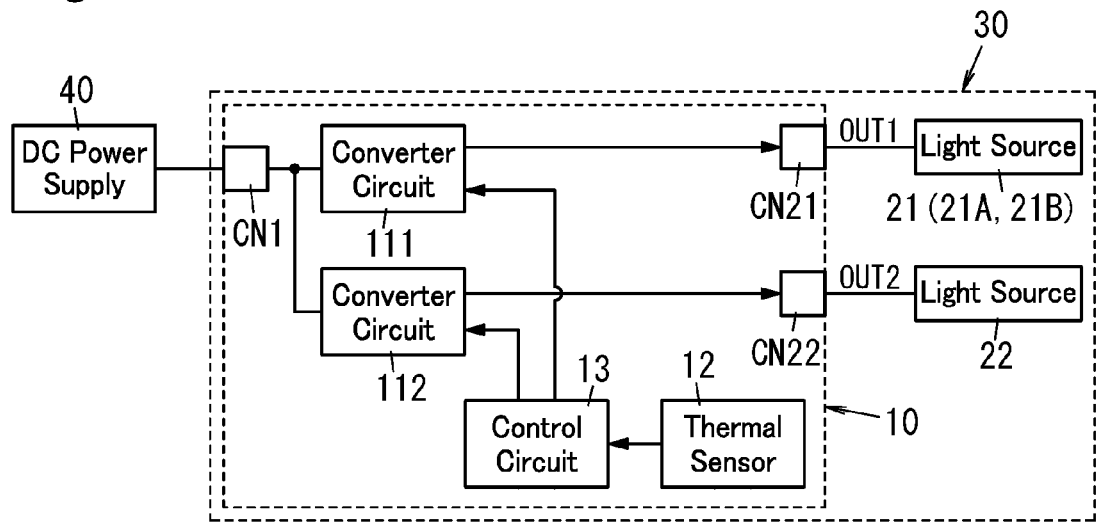
FIG. 1 is a block diagram of a lighting device in accordance with Embodiment 1.

Referring to FIG. 1, a lighting device 10 according to an embodiment includes a thermal sensor 12, power converter circuits (converter circuits 111 and 112), and a control circuit 13.

Figure 2:
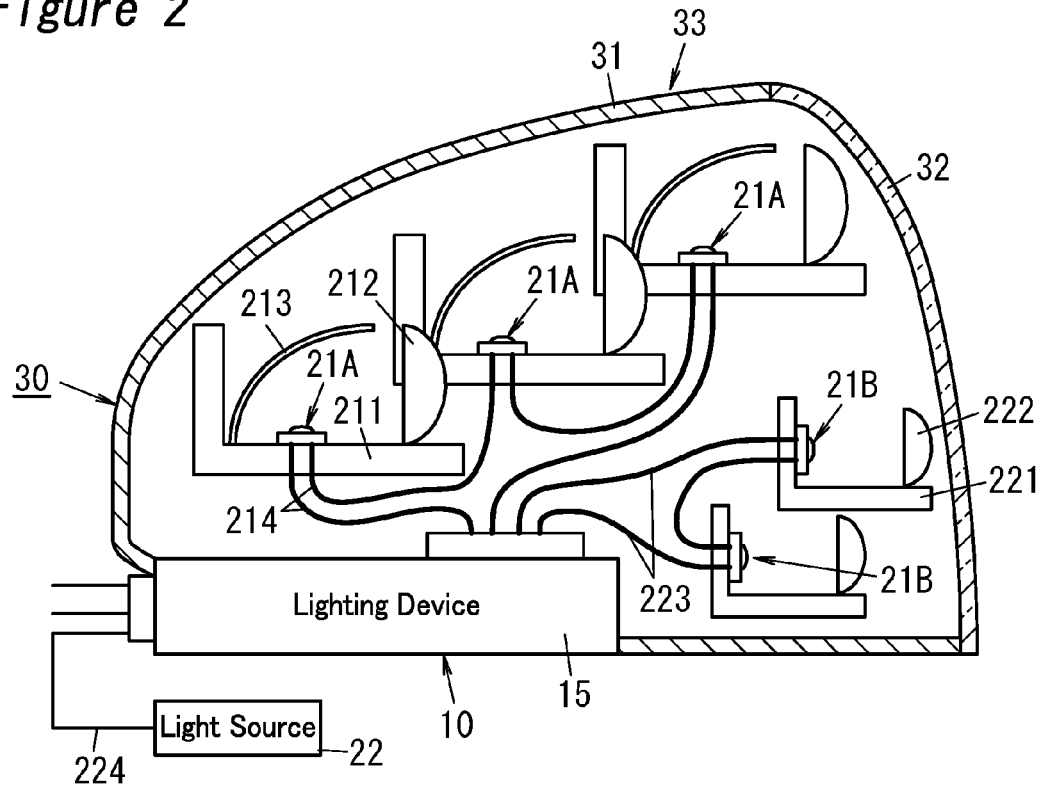
FIG. 2 is a sectional view of a vehicle lighting system in accordance with Embodiment 1.

The thermal sensor 12 is configured to detect (measure) an internal temperature of a case 15 (see FIG. 2).

The power converter circuits (converter circuits 111 and 112) are housed in the case 15 and configured to be connected with different types of light sources 21 and 22, respectively. Examples of the different types of light sources 21 and 22 may include, as different functions, low/high-beam headlights vs. marker lights and low-beam headlights vs. high-beam headlights. Examples of the different types may further include different electrical characteristics and different operational characteristics.

The control circuit 13 is housed in the case 15 and configured to control respective outputs (output levels) OUT1 and OUT2 of the power converter circuits (converter circuits 111 and 112).

The control circuit 13 has different priorities (priority levels) that are provided to the different types of light sources 21 and 22 according to their respective types. For example, the priorities are provided in order to decrease the respective outputs when the internal temperature detected with the thermal sensor 12 is greater (higher) than a threshold. In an example, the priorities may be provided in order to decrease the respective outputs when the internal temperature detected with the thermal sensor 12 is greater than or equal to the threshold.

The control circuit 13 is configured to, when the internal temperature detected with the thermal sensor 12 is greater than the threshold, control the respective outputs of the power converter circuits (converter circuits 111 and 112) so as to preferentially (linearly, non-linearly or stepwise) decrease the output with respect to one of the different types of light sources 21 and 22, which corresponds to a first priority, relative to the output of other of the different types of light sources 21 and 22, which correspond to a priority different from the first priority (hereinafter referred to as a "Configuration A"). In an example, the control circuit 13 may be configured to, when the internal temperature detected with the thermal sensor 12 is greater than or equal to the threshold, control the respective outputs of the power converter circuits so as to preferentially decrease an output with respect to a light source, which corresponds to a first priority, of the different types of light sources 21 and 22. The embodiments to be explained below correspond to this example, but the present disclosure is not limited thereto.

In an example, the lighting device 10 has two or more power converter circuits configured to be individually connected with two or more different types of light sources, and the control circuit 13 has two or more different types of priorities (two or more different priority levels) that are individually provided to the two or more different types of light sources and that are different from each other. In case the lighting device 10 has two power converter circuits (hereinafter referred to as a "two-converter configuration"), the control circuit 13 has two different types of priorities (two different priority levels) that include a first priority and a second priority that is lower than the first priority. In case the lighting device 10 has three power converter circuits (hereinafter referred to as a "three-convert configuration"), the control circuit 13 has three different types of priorities (three different priority levels) that include a first priority, a second priority that is lower than the first priority, and a third priority that is lower than the first and second priorities.

In the example of the two-converter configuration, when the internal temperature of the case 15 is greater than or equal to the threshold, the control circuit 13 is to control the respective outputs of the power converter circuits (converter circuits 111 and 112) so as to decrease an output with respect to a light source corresponding to a high priority (first priority), in accordance with the priorities that are provided (set) according to the respective types of the light sources 21 and 22. It is therefore possible to suppress the increase of the internal temperature because when the internal temperature is greater than or equal to the threshold, the output with respect to the light source corresponding to the high priority is decreased preferentially, thereby suppressing the generation of heat from components of a corresponding power converter circuit. In addition, since the output with respect to the light source corresponding to the high priority is decreased preferentially, it is possible to prevent an output to be supplied to a light source corresponding to a low priority from being decreased preferentially. Thus, the lighting device 10 has an advantage of limiting an output current according to the priorities corresponding to the respective types of the light sources.

In addition, since the different types of light sources 21 and 22 are lit by one lighting device 10, it is possible to decrease the number of wires between a power supply and the lighting device 10 and miniaturize the lighting device 10, in comparison with the case where a lighting device 10 is provided for each of the different types of light sources 21 and 22.

(2) Detailed Description

Hereinafter, a lighting device 10 and a vehicle lighting system 30 equipped with the lighting device 10, in accordance with Embodiment 1 will be explained with reference to the drawings.

(2.1) Explanation of Lighting Device

Figure 3:
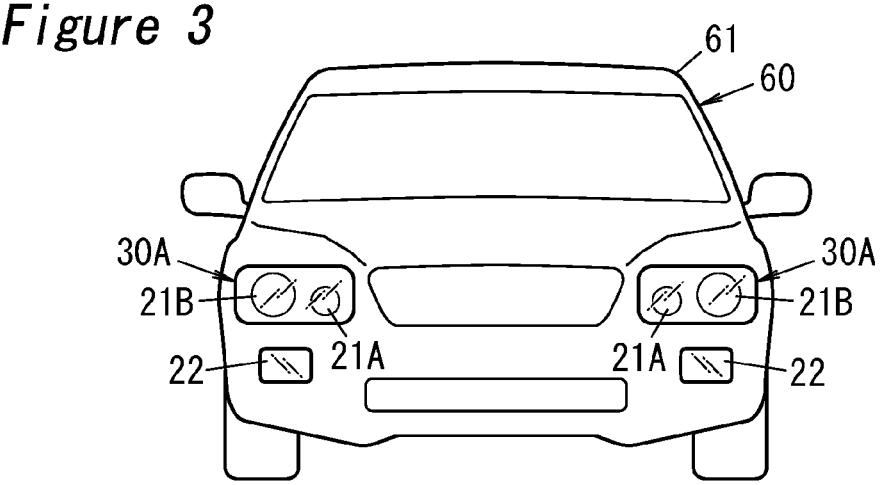
FIG. 3 is a front view of a vehicle equipped with the vehicle lighting system.

In the embodiment, the lighting device 10 is provided for the vehicle lighting system 30 which a vehicle 60 such as a car is equipped with (see FIGS. 2 and 3).

As shown in FIG. 1, the lighting device 10 preferably includes two converter circuits 111 and 112, a thermal sensor 12 and a control circuit 13. The lighting device 10 may also include a connector CN1 that allows a power supply to be connected thereto, and two connectors CN21 and CN22 that allow two light sources 21 and 22 to be connected thereto.

The lighting device 10 is preferably configured to cause two types of light sources 21 and 22 to light (emit light). The light source 21 may include, for example light sources (light source devices) 21A as a low-beam headlight, and light sources (light source devices) 21B as a high-beam headlight (see FIG. 2). Examples of the light source 22 include a turn signal lump, and a marker light such as a side-marker light and a DRL (Daytime Running Light). Each of the light sources 21A, 21B and 22 may be composed of, for example light emitting diodes that are connected in series or parallel with each other.

In the example of FIG. 1, the connector CN1 allows power supply wires from a DC power supply 40 to be connected thereto.

In the example of FIGS. 1 and 2, the connector CN21 allows electric wires 214 and electric wires 223 for connecting the light source 21 (the light sources 21A and 21B) to the lighting device 10 to be connected thereto.

Also in this example, the connector CN22 allows electric wires 224 for connecting the light source 22 to the lighting device 10 to be connected thereto.

In the example of FIG. 1, input terminals of the converter circuit 111 are electrically connected to the connector CN1, while output terminals of the converter circuit 111 are electrically connected to the connector CN21. The converter circuit 111 may be, for example a step-up DC-DC converter. The converter circuit 111 may be configured to convert a DC voltage from the DC power supply 40 into an output (an output voltage or an output current) for the light source 21 to supply the light source 21 with the output as an output OUT1 of the converter circuit 111.

Also in this example, input terminals of the converter circuit 112 are electrically connected to the connector CN1, while output terminals of the converter circuit 112 is electrically connected to the connector CN22. The converter circuit 112 may be, for example a step-up DC-DC converter. The converter circuit 112 may be configured to convert the DC voltage from the DC power supply 40 into an output (an output voltage or an output current) for the light source 22 to supply the light source 22 with the output as an output OUT2 of the converter circuit 112.

In the example of FIGS. 1 and 2, the thermal sensor 12 is configured to detect (measure) a temperature of the internal atmosphere of a case 15. The temperature is hereinafter referred to as an internal temperature. Preferably, the case 15 houses a circuit board which the converter circuits 111 and 112 and a control circuit 13 are provided on. The thermal sensor 12 may include, for example a thermistor and be mounted on the circuit board which the converter circuits 111 and 112 and the control circuit 13 are provided on.

Preferably, the control circuit 13 is configured to control the respective outputs OUT1 and OUT2 of the converter circuits 111 and 112, and previously has priorities that are provided to the light sources 21 and 22 according to their respective types. For example, the priorities are provided in order to decrease the respective outputs when the internal temperature detected with the thermal sensor 12 is greater than or equal to a threshold. In the embodiment, since the type of the light source 21 is a headlight type and the type of the light source 22 is a marker light type, the light source 21 has an importance degree higher than that the light source 22 has because driving of the vehicle 60 is directly influenced by the light source 21. Therefore, in the embodiment, as the priorities for output reduction during a high temperature, the light source 21 as the headlight that belongs to a high importance degree type is set to a lower level (value) than that of the light source 22 as the marker light that belongs to a low importance degree type.

Preferably, the control circuit 13 is configured to, when the internal temperature detected with the thermal sensor 12 is less than the threshold, control the respective outputs OUT1 and OUT2 of the converter circuits 111 and 112 so that the outputs OUT1 and OUT2 accord with respective rated outputs (rated currents or rated voltages) in conformity with the light sources 21 and 22. In the example of Configuration A, the control circuit 13 may be configured to, when the internal temperature detected with the thermal sensor 12 is less than or equal to the threshold, control the respective outputs OUT1 and OUT2 of the converter circuits 111 and 112 so that the outputs OUT1 and OUT2 accord with the respective rated outputs in conformity with the light sources 21 and 22. The embodiments to be explained below correspond to the former, but the present disclosure is not limited thereto.

The control circuit 13 is preferably configured to, when the internal temperature detected with the thermal sensor 12 is greater than or equal to the threshold, control the respective outputs OUT1 and OUT2 of the converter circuits 111 and 112 so as to preferentially decrease an output with respect to a light source, which corresponds to a high priority, of the light sources 21 and 22.

Incidentally, the control circuit 13 preferably has the priorities that are provided according to the types of the light sources 21 and 22 in advance, but may have priorities that are provided based on the respective types of the light sources and respective rated output currents (respective values) of the light sources. For example, in the case where the respective types have a similar importance degree, respective priorities may be provided based on the rated output currents of the light sources within the light sources, types of which have the similar importance degree, and a higher priority may be provided to a light source having a larger rated output current.

(2.2) Explanation of Vehicle Lighting System

As shown in FIGS. 1 and 2, the vehicle lighting system 30 according to the embodiment includes, on each side of right and left, the light source 21 (the light sources 21A and 21B) as low/high-beam headlights, the light source 22 as a marker light, and a housing 33.

Preferably, the vehicle lighting system 30 is a lighting system configured to cause headlights and marker lights of the vehicle 60 such as, for example a car (see FIG. 3) to light.

The housing 33 preferably includes: a body 31, in a front of which an opening is provided; and an optically transparent cover 32 attached to the opening of the body 31. The housing 33 of the vehicle lighting system 30 may be configured to be attached to a vehicle body 61 of the vehicle 60 (see FIG. 3) via a bracket, screws, snap-fit, etc.

In the example of FIGS. 2 and 3, the light source 21 as the headlights is housed in the housing 33. The case 15 of the lighting device 10 is also attached in a bottom of the housing 33.

The light source 21 may include light sources 21A as a low-beam headlight and light sources 21B as a high-beam headlight.

Light emitting diodes constituting each light source 21A as the low-beam headlight may be attached on a substrate 211. A lens 212 and a reflector 213 may be attached to the substrate 211 which the light sources 21A are attached on.

Light emitting diodes constituting each light source 21B as the high-beam headlight may be attached on a substrate 221. A lens 222 may be attached to the substrate 221 which the light sources 21B are attached on.

The light source 22 as the marker light may be provided outside the housing 33, and the light source 22 may be electrically connected to the lighting device 10 via electric wires 224.

(2.3) Explanation of Operation

An operation of the lighting device 10 in the embodiment will be explained with reference to FIGS. 4 to 7.

Figure 4:
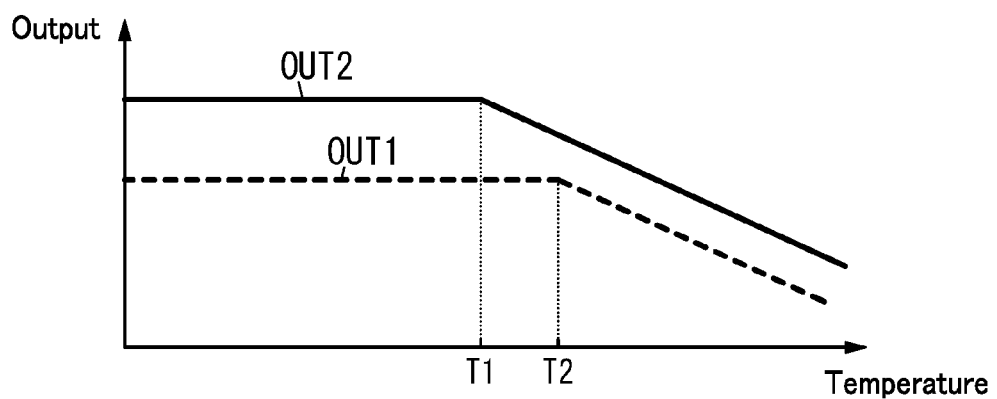
FIG. 4 is a graph showing output characteristics of the lighting device and the relation between an internal temperature and an output thereof.

FIG. 4 is a graph showing output characteristics of the lighting device 10. In FIG. 4, a horizontal axis represents an internal temperature detected with the thermal sensor 12, and a vertical axis represents respective outputs OUT1 and OUT2 of the converter circuits 111 and 112.

In the example of FIG. 4, when the internal temperature of the case 15 is less than (less than or equal to) the threshold T1, the control circuit 13 adjusts the respective outputs OUT1 and OUT2 of the converter circuits 111 and 112 to respective rated values corresponding to the light sources 21 and 22. Note that in the example of FIG. 4 the rated value of the output OUT1 of the converter circuit 111 is set to a value lower than the rated value of the output OUT2 of the converter circuit 112.

In the example, if the internal temperature of the case 15 rises due to the generation of heat from circuit components when the light sources are lit and then the internal temperature is greater than or equal to the threshold T1, the control circuit 13 preferentially decrease the output OUT2 with respect to the light source 22 corresponding to the high priority. Specifically, when the internal temperature is greater than or equal to the threshold T1, the control circuit 13 decreases the output OUT2 of the converter circuit 112 for the light source 22 at a constant rate proportionate to the internal temperature. If the output OUT2 of the converter circuit 112 decreases, the generation of heat from circuit components of the converter circuit 112 is suppressed, thereby suppressing the rise in the internal temperature of the case 15. The rise in temperature of circuit components in the lighting device 10 is therefore suppressed, and the circuit components can be protected. In addition, by decreasing the output OUT2 for the light source 22 corresponding to the high priority, the control circuit 13 can maintain the rated output with respect to the output OUT1 for the light source 21 corresponding to the low priority for a longer period of time. It is therefore possible to prevent the brightness of the light source 21 corresponding to the low priority, namely belonging to the high importance degree type from being dark.

When the internal temperature is greater than or equal to the threshold (first threshold) T1 and less than a threshold (second threshold) T2 (T2>T1), the control circuit 13 may maintain the rated output with respect to the output OUT1 of the converter circuit 111 for the light source 21 corresponding to the low priority.

When the internal temperature of the case 15 further rises to be greater than or equal to the threshold T2, the control circuit 13 may also decrease the output OUT1 of the converter circuit 111 for the light source 21 corresponding to the low priority. Specifically, when the internal temperature is greater than or equal to the threshold T2, the control circuit 13 may decrease the output OUT1 of the converter circuit 111 for the light source 21 at a constant rate proportionate to the internal temperature.

Thus, when the internal temperature of the case 15 further rises to be greater than or equal to the threshold T2, the control circuit 13 can accordingly suppress the generation of heat from the circuit components to suppress a further rise in the internal temperature by decreasing both of the outputs OUT1 and OUT2 of the converter circuits 111 and 112.

Thus, the control circuit 13 has respective thresholds T1 and T2 that are provided to the different types of light sources 21 and 22 so that respective temperatures of the thresholds are lower as respective light sources correspond to a higher priority. In the example of FIG. 4, the threshold T1 of a low temperature is provided to the light source 22 corresponding to the high priority of the different types of light sources 21 and 22. It is accordingly possible to preferentially decrease the output for the light source corresponding to the high priority.

Note that preferably a rate at which the control circuit 13 decreases the respective electric power output to the different types of light sources 21 and 22, according to a rise in the internal temperature when the internal temperature detected with the thermal sensor 12 is greater than or equal to the threshold, increases as the respective different types of light sources correspond to higher priority.

An operation of the lighting device 10 in this case will be explained with reference to FIG. 5.

Figure 5:
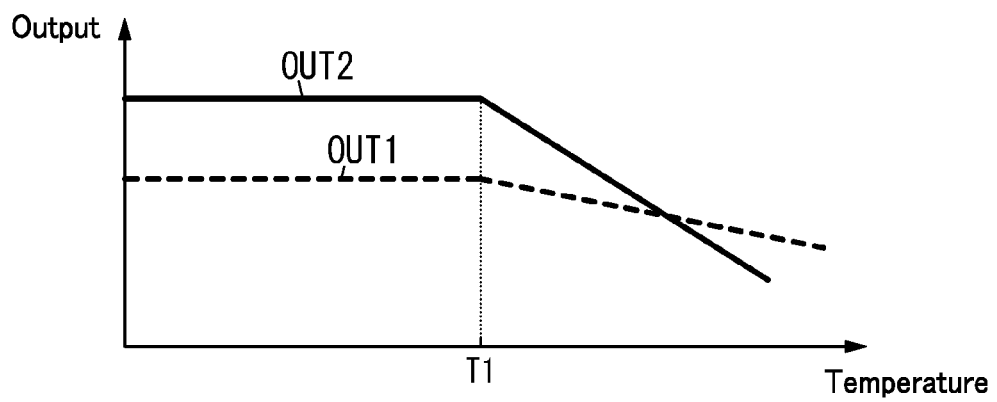
FIG. 5 is a graph showing other output characteristics of the lighting device and another relation between an internal temperature and an output thereof.

FIG. 5 is a graph showing output characteristics of the lighting device 10. In FIG. 5, a horizontal axis represents an internal temperature detected with the thermal sensor 12, and a vertical axis represents respective outputs OUT1 and OUT2 of the converter circuits 111 and 112.

In the example of FIG. 5, when the internal temperature is less than (less than or equal to) a threshold T1, the control circuit 13 adjusts the respective outputs OUT1 and OUT2 of the converter circuits 111 and 112 to respective rated outputs corresponding to the light sources 21 and 22. Note that in the example of FIG. 5 the rated value of the output OUT1 of the converter circuit 111 is set to a value lower than the rated value of the output OUT2 of the converter circuit 112.

In the example, if the internal temperature of the case 15 rises due to the generation of heat from circuit components when the light sources are lit and then the internal temperature is greater than or equal to (greater than) the threshold T1, the control circuit 13 controls the converter circuits 111 and 112 so as to decrease the respective outputs OUT1 and OUT2 for the light sources 21 and 22. Here, the control circuit 13 decreases the respective outputs to the light sources proportionate to a rise in the internal temperature at different rates based the priority of the respective light sources. In the embodiment, the light source 22 has a priority higher than a priority the light source 21 has. The control circuit 13 accordingly decreases the output OUT2 of the converter circuit 112 proportionate to a rise in the internal temperature when the internal temperature is greater than or equal to the threshold T1 at a higher rate than a decreasing the output OUT1 of the converter circuit 111 proportionate to the rise in the internal temperature.

Thus, if the control circuit 13 decreases both the outputs OUT1 and OUT2 of the converter circuits 111 and 112 when the internal temperature of the case 15 is greater than or equal to the threshold T1, it is possible to suppress the generation of heat from the circuit components, thereby suppressing a further rise in the internal temperature.

Moreover, it is possible to preferentially decrease the output OUT2 for the light source 22 because the control circuit 13 provides a larger decreasing rate of the output OUT2 of the converter circuit 112 proportionate to a rise in the internal temperature than the decreasing rate of the output OUT1 of the converter circuit 111 proportionate to the rise in the internal temperature. Therefore, the rise in the internal temperature of the case 15 can be suppressed. In addition, when the internal temperature is greater than or equal to the threshold T1, the rate of the output OUT1 for the light source 21 to be decreased from a rated output of the light source 21 is smaller than a rate of the output OUT2 for the light source 22 to be decreased from a rated output of the light source 22. It is accordingly possible to prevent the brightness of the light source 21 belonging to the high importance degree type from being dark while suppressing the rise in the internal temperature of the case 15.

The control circuit 13 may also have respective different thresholds that are provided to the different types of light sources so that respective temperatures of the thresholds are lower as respective light sources correspond to a higher priority. The control circuit 13 may configured to more increase decreasing rates, of respective electric power to be output to the different types of light sources according to a rise in the internal temperature when the internal temperature detected with the thermal sensor 12 is greater than or equal to the respective thresholds, as respective light sources correspond to a higher priority.

Figure 6:
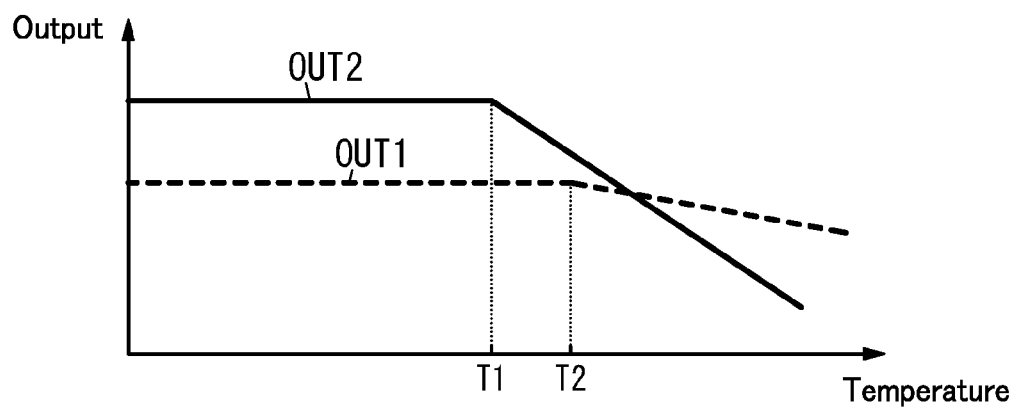
FIG. 6 is a graph showing still other output characteristics of the lighting device and still another relation between an internal temperature and an output thereof.

An operation of the lighting device 10 in this case will be explained with reference to FIG. 6. FIG. 6 is a graph showing output characteristics of the lighting device 10. In FIG. 6, a horizontal axis represents an internal temperature detected with the thermal sensor 12, and a vertical axis represents respective outputs OUT1 and OUT2 of the converter circuits 111 and 112.

In the example of FIG. 6, when the internal temperature is less than (less than or equal to) a threshold T1, the control circuit 13 controls the respective outputs OUT1 and OUT2 of the converter circuits 111 and 112 at respective rated outputs corresponding to the light sources 21 and 22. Note that in the example of FIG. 6 the rated value of the output OUT1 of the converter circuit 111 is set to a value lower than the rated value of the output OUT2 of the converter circuit 112.

In the example, if the internal temperature of the case 15 rises due to the generation of heat from circuit components when the light sources are lit and then the internal temperature is greater than or equal to the threshold T1, the control circuit 13 preferentially decreases the output OUT2 for the light source 22 corresponding to the high priority. Specifically, the control circuit 13 decreases the output OUT2 of the converter circuit 112 for the light source 22 at a constant rate proportionate to the internal temperature, when the internal temperature is greater than or equal to the threshold T1. If the output OUT2 of the converter circuit 112 is decreased, the rise in the internal temperature of the case 15 can be suppressed because the generation of heat from circuit components of the converter circuit 112 is suppressed. The rise in temperature of circuit components in the lighting device 10 is therefore suppressed, and the circuit components can be protected. The control circuit 13 can also maintain the rated output with respect to the output OUT1 for the light source 21 corresponding to the low priority for a longer period of time, by decreasing the output OUT2 for the light source 22 corresponding to the high priority.

When the internal temperature is greater than or equal to the threshold T1 and less than (less than or equal to) a threshold T2 (T2>T1), the control circuit 13 may maintain the rated output with respect to the output OUT1 of the converter circuit 111 for the light source 21 corresponding to the low priority.

When the internal temperature of the case 15 further rises to be greater than or equal to the threshold T2, the control circuit 13 may also decrease the output OUT1 of the converter circuit 111 for the light source 21 corresponding to the low priority. Specifically, when the internal temperature is greater than or equal to the threshold T2, the control circuit 13 may decrease the output OUT1 of the converter circuit 111 for the light source 21 at a constant rate proportionate to the internal temperature. In the example of FIG. 6, the control circuit 13 provides higher decreasing rates of the respective outputs for the different types of light sources proportionate to a rise in the internal temperature, as respective light sources correspond to a higher priority. That is, the control circuit 13 may decrease the output OUT2 of the converter circuit 112 proportionate to a rise in the internal temperature at a higher rate than a decreasing rate of the output OUT1 of the converter circuit 111 proportionate to the rise in the internal temperature.

Thus, if the control circuit 13 decreases both the outputs OUT1 and OUT2 of the converter circuits 111 and 112 when the internal temperature of the case 15 further rises to be greater than or equal to the threshold T2, it is possible to suppress the generation of heat from the circuit components, thereby suppressing a further rise in the internal temperature. In addition, if the control circuit 13 decreases the output OUT2 of the converter circuit 112 proportionate to a rise in the internal temperature at a higher rate than a decreasing rate of the output OUT1 of the converter circuit 111 proportionate to the rise in the internal temperature, the output OUT2 for the light source 22 can be decreased preferentially. It is therefore possible to prevent the brightness of the light source 21 belonging to the high importance degree type from being dark while suppressing the rise in the internal temperature of the case 15.

The control circuit 13 may have respective different stop temperatures T3 and T4 that are provided to the different types of light sources 21 and 22 and that are greater than the threshold(s). The control circuit 13 may also be configured to, when the internal temperature detected with the thermal sensor 12 is sequentially greater than (greater than or equal to) the stop temperatures T3 and T4, control the respective outputs of the converter circuits 111 and 112 so as to stop the respective outputs OUT1 and OUT2 for the light sources 21 and 22 in order of priority (in descending order of priority). Note that in the example of FIG. 7 the stop temperatures T3 and T4 are set to be higher than the thresholds T1 and T2 where a relation of the thresholds T1 and T2 and the stop temperatures T3 and T4 is given by T1<T2<T3<T4.

An operation of the lighting device 10 in this case will be explained with reference to FIG. 7. Note that the operation is the same as the operation in the example of FIG. 4 except that the output OUT2 for the light source 22 is stopped when the internal temperature is greater than or equal to the stop temperature T3 and the output OUT1 for the light source 21 is stopped when the internal temperature is greater than or equal to the stop temperature T4.

Figure 7:
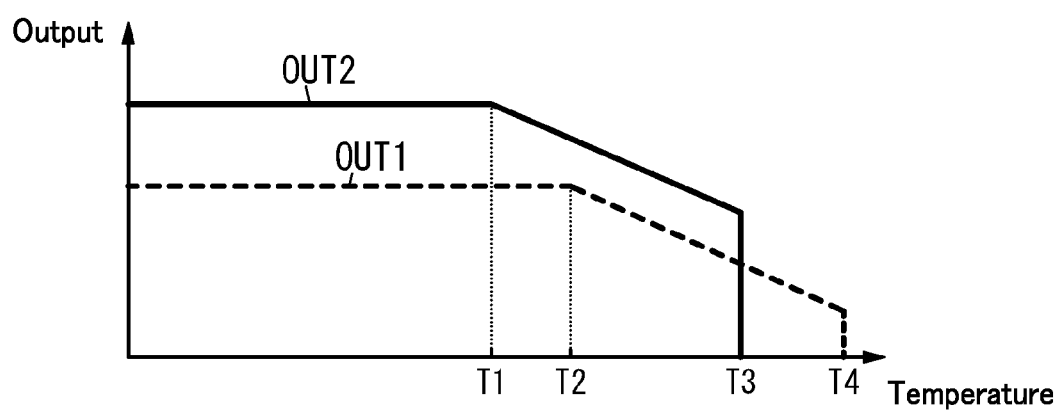
FIG. 7 is a graph showing yet other output characteristics of the lighting device and yet another relation between an internal temperature and an output thereof.

In the example of FIG. 7, the control circuit 13 controls the respective outputs OUT1 and OUT2 of the converter circuits 111 and 112 at respective rated outputs corresponding to the light sources 21 and 22 when the internal temperature is less than (less than or equal to) the threshold T1. Note that in the example of FIG. 7 a rated value of the output OUT1 of the converter circuit 111 is set to be lower than a rated value of the output OUT2 of the converter circuit 112.

In the example, if the internal temperature of the case 15 rises due to the generation of heat from circuit components when the light sources are lit and then the internal temperature is greater than or equal to the threshold T1, the control circuit 13 preferentially decreases the output OUT2 for the light source 22 corresponding to the high priority. Specifically, the control circuit 13 decreases the output OUT2 of the converter circuit 112 for the light source 22 at a constant rate proportionate to the internal temperature, when the internal temperature is greater than or equal to the threshold T1. If the output OUT2 of the converter circuit 112 is decreased, the rise in the internal temperature of the case 15 can be suppressed because the generation of heat from circuit components of the converter circuit 112 is suppressed. The rise in temperature of circuit components in the lighting device 10 is therefore suppressed, and the circuit components can be protected. The control circuit 13 can also maintain the rated output with respect to the output OUT1 for the light source 21 corresponding to the low priority for a longer period of time, by decreasing the output OUT2 for the light source 22 corresponding to the high priority.

When the internal temperature is greater than or equal to the threshold T1 and less than (less than or equal to) a threshold T2 (T2>T1), the control circuit 13 may maintain the rated output with respect to the output OUT1 of the converter circuit 111 for the light source 21 corresponding to the low priority.

When the internal temperature of the case 15 further rises to be greater than or equal to the threshold T2, the control circuit 13 may also decrease the output OUT1 of the converter circuit 111 for the light source 21 corresponding to the low priority. Specifically, when the internal temperature is greater than or equal to the threshold T2, the control circuit 13 may decrease the output OUT1 of the converter circuit 111 for the light source 21 at a constant rate proportionate to the internal temperature.

In the example of FIG. 7, when the internal temperature of the case 15 further rises to be greater than or equal to the stop temperature T3 (T3>T2), the control circuit 13 stops the output OUT2 of the converter circuit 112 for the light source 22 corresponding to the high priority. That is, when the internal temperature is greater than or equal to the stop temperature T3, the control circuit 13 stops the output OUT2 of the converter circuit 112 for the light source 22 corresponding to the high priority, thereby turning the light source 22 off. It is accordingly possible to prevent the brightness of the light source 21 corresponding to the low priority, namely belonging to the high importance degree type from being dark because the rise in the internal temperature of the case 15 is suppressed.

In the example, when the internal temperature of the case 15 further rises to be greater than or equal to the stop temperature T4, the control circuit 13 stops the output OUT1 of the converter circuit 111 for the light source 21 corresponding to the low priority. That is, when the internal temperature is greater than or equal to the stop temperature T4, the control circuit 13 stops the output OUT1 of the converter circuit 111 for the light source 21 corresponding to the low priority, thereby turning the light source 21 off. The circuit components can be protected because the rise in the internal temperature of the case 15 is suppressed.

Note that in order to perform the control operations shown in FIGS. 5 and 6 the control circuit 13 may be configured to, when the internal temperature is sequentially greater than or equal to the stop temperatures higher than the threshold(s), control the respective outputs of the converter circuits 111 and 112 so as to stop the respective outputs for the light sources in order of priority (in descending order of priority). The control circuit 13 performs such a control, and thereby the circuit components can be protected.

(3) Advantages

As stated above, a lighting device 10 according to a first aspect includes a thermal sensor 12, power converter circuits (e.g., converter circuits 111 and 112) and a control circuit 13. The thermal sensor is configured to detect (measure) an internal temperature of a case 15. The power converter circuits are housed in the case 15 and configured to be connected with different types of light sources 21 and 22, respectively. The control circuit 13 is housed in the case 15 and configured to control respective outputs (output levels) of the power converter circuits. The control circuit has priorities that are provided to the different types of light sources 21 and 22 according to their respective types. For example, the priorities are provided in order to decrease the respective outputs when the internal temperature detected with the thermal sensor 12 is greater than (greater than or equal to) a threshold. The control circuit 13 is configured to, when the internal temperature detected with the thermal sensor 12 is greater than (greater than or equal to) the threshold, control the respective outputs of the power converter circuits so as to preferentially decrease an output with respect to a light source, which corresponds to a first priority, of the different types of light sources 21 and 22.

In the first aspect, when the internal temperature of the case 15 is greater than the threshold, the control circuit 13 preferentially decreases the output with respect to the light source corresponding a high priority (the first priority). It is accordingly possible to suppress the generation of heat from the power converter circuit for the light source corresponding to the high priority, thereby suppressing a rise in the internal temperature of the case 15. The first aspect therefore has an advantage of preventing a decrease in the output for a light source corresponding to a low priority while suppressing the rise in the internal temperature. Here, the priorities are set according to the respective types of the light sources. If respective priorities are lower as respective light sources belong to a higher importance degree type, it is possible to prevent an output for a light source that belongs to a high important degree type from being decreased preferentially.

In the first aspect, the priorities are provided to the different types of light sources 21 and 22 based on both the respective types and their respective rated output currents (specifically respective values) (hereinafter referred to as a "second aspect"). This configuration is an option, and can be omitted. The configuration can be appropriately combined with other configurations and modified examples of Embodiment 1.

For example, if respective priorities are higher as respective light sources have a larger rated output current, it is possible to preferentially reduce the output for the light source with a large rated output current. In the case where the output for the light source with a relatively large rated output current is decreased, the generation of heat from a corresponding power converter circuit can be suppressed more efficiently in comparison with the case where the output for the light source with a relatively small rated output current is decreased. The second aspect can more efficiently suppress a rise in the internal temperature of the case 15 and prevent the output for the light source corresponding to the low priority from being decreased preferentially.

In a first or second aspect, the control circuit 13 has respective thresholds that are provided to the different types of light sources 21 and 22 so that respective temperatures of the thresholds are lower as respective light sources correspond to a higher priority. The control circuit 13 is configured to decrease, when the internal temperature detected with the thermal sensor 12 is greater than the respective thresholds, the output with respect to different types of light sources 21 and 22. This aspect is hereinafter referred to as a "third aspect". This configuration is an option, and can be omitted. The configuration can be appropriately combined with other configurations and modified examples of Embodiment 1.

Accordingly, the output for the light source corresponding to the high priority can be decreased preferentially because the output for the light source corresponding to the high priority is suppressed by a threshold corresponding to a low temperature.

In a first or second aspect, a rate at which the control circuit 13 decreases the respective electric power output to the different types of light sources 21 and 22, according to a rise in the internal temperature when the internal temperature detected with the thermal sensor 12 is greater than (greater than equal to) the threshold, increases as the respective different types of light sources correspond to higher priority (hereinafter referred to as a "fourth aspect"). This configuration is an option, and can be omitted. The configuration can be appropriately combined with other configurations and modified examples of Embodiment 1.

Thus, the light source corresponding to the high priority receives electric power decreased at a larger decreasing rate according to a rise in the internal temperature. Accordingly, the output for the light source corresponding to the high priority can be decreased preferentially.

In a first or second aspect, the control circuit 13 has respective thresholds that are provided to the different types of light sources 21 and 22 so that respective temperatures of the thresholds are lower as respective light sources correspond to a higher priority. The control circuit 13 is configured to decrease, when the internal temperature detected with the thermal sensor 12 is greater than (greater than or equal to) the respective threshold, the output with respect to different types of light sources 21 and 22. A rate at which the control circuit 13 decreases the respective electric power output to the different types of light sources 21 and 22, according to a rise in the internal temperature when the internal temperature detected with the thermal sensor 12 is greater than (greater than or equal to) the respective thresholds, increases as the respective different types of light sources correspond to higher priority. Hereinafter, this configuration is referred to as a "fifth aspect". This configuration is an option, and can be omitted. The configuration can be appropriately combined with other configurations and modified examples of Embodiment 1.

Since the output for the light source corresponding to the high priority is suppressed by a threshold corresponding to a low temperature, the output for the light source corresponding to the high priority can be decreased preferentially. In addition, since the light source corresponding to the high priority receives electric power decreased at a large decreasing rate according to a rise in the internal temperature, the output for the light source corresponding to the high priority can be decreased preferentially.

In a first or second aspect, the control circuit 13 has different respective stop temperatures that are provided to the different types of light sources 21 and 22 and that are greater than the threshold. The control circuit 13 is also configured to, when the internal temperature measured with the thermal sensor is sequentially greater than (greater than or equal to) the respective stop temperatures, control the respective outputs of the power converter circuits (converter circuits 111 and 112) so as to stop respective outputs with respect to the different types of light sources 21 and 22 in order of priority. Hereinafter, this configuration is referred to as a "sixth aspect". This configuration is an option, and can be omitted. The configuration can be appropriately combined with other configurations and modified examples of Embodiment 1.

Since the control circuit 13 stops respective outputs for the light sources 21 and 22 in order of priority when the internal temperature of the case 15 is sequentially greater than (greater than equal to) the stop temperatures, a rise in the internal temperature can be suppressed. It is also possible to supply the output (electric power) to the light source corresponding to the low priority for a longer period of time in comparison with the light source corresponding to the high priority.

In any one of the first to sixth aspects, each of the different types of light sources 21 (21A, 21B) and 22 is preferably a light emitting diode light source (hereinafter referred to as a "seventh aspect"). This configuration is an option, and can be omitted. The configuration can be appropriately combined with other configurations and modified examples of Embodiment 1.

A vehicle lighting system as an eighth aspect includes: a lighting device 10 of any one of the first to seventh aspects; the different types of light sources 21 and 22; and a housing 33. The different types of light sources 21 and 22 are to be lit by the lighting device 10. The housing 33 holds the lighting device 10 and at least one of the different types of light sources 21 and 22 and is configured to be attached to a vehicle 60.

When the internal temperature of the case 15 is greater than the threshold, respective outputs for the light sources 21 and 22 can be decreased according to the priorities corresponding to the types of the light sources 21 and 22 and a rise in the internal temperature can be suppressed.

(4) Modified Examples

Hereinafter, modified examples of the lighting device and the vehicle lighting system in the embodiment will be described. Note that each configuration of the modified examples to be explained below may be appropriately combined with each configuration in the aforementioned embodiment.

In the lighting device 10 of the embodiment, the converter circuits 111 and 112 as the power converter circuits are step-up DC-DC converters, but the power converter circuits may be step-down DC-DC converters or step-up/down DC-DC converters.

The lighting device 10 of the embodiment includes the two power converter circuits (converter circuits 111 and 112) that are respectively connected with the two light sources 21 and 22, but may include three or more power converter circuits that are respectively connected with three or more light sources. In this case, the control circuit 13 preferably has priorities provided to the three or more light sources according to their respective types.

In the lighting device 10 of the embodiment, the light source 22 corresponding to the high priority has a rated output larger than that of the light source 21 corresponding to the low priority, but the light source 22 corresponding to the high priority may have a rated output smaller than that of the light source 21 corresponding to the low priority. That is, the control circuit 13 may have priorities provided according to the types of the light sources 21 and 22 regardless of respective values of the rated outputs of the light sources 21 and 22.

The lighting device 10 of the embodiment is applied to the vehicle lighting system, and the light source corresponding to the high priority and the light source corresponding to the low priority are a headlight and a marker light, respectively, but the types of the light sources are not limited to those of the embodiment. For example, the light source corresponding to the high priority may be a low-beam headlight, and the light source corresponding to the low priority may be a high-beam headlight. Priorities are not limited to the two different types of priorities, but may be three or more different types of priorities. For example, a light source corresponding to a first (a highest) priority may be a low-beam headlight, a light source corresponding to a second (a second highest) priority may be a high-beam headlight, and a light source corresponding to a third (a lowest) priority may be a marker light, In the embodiment, two lighting devices 10 are applied to the vehicle, but not limited to this. For example, as long as a lighting system which one or more lighting devices 10 are applied to is configured to cause one lighting device 10 to light the different types of light sources, the lighting device(s) 10 can be applied to such other lighting systems including one or more lighting devices for lighting, for example headlights, marker lights and the like for railway vehicles, air vehicles, etc.

Embodiment 2

Figure 8:
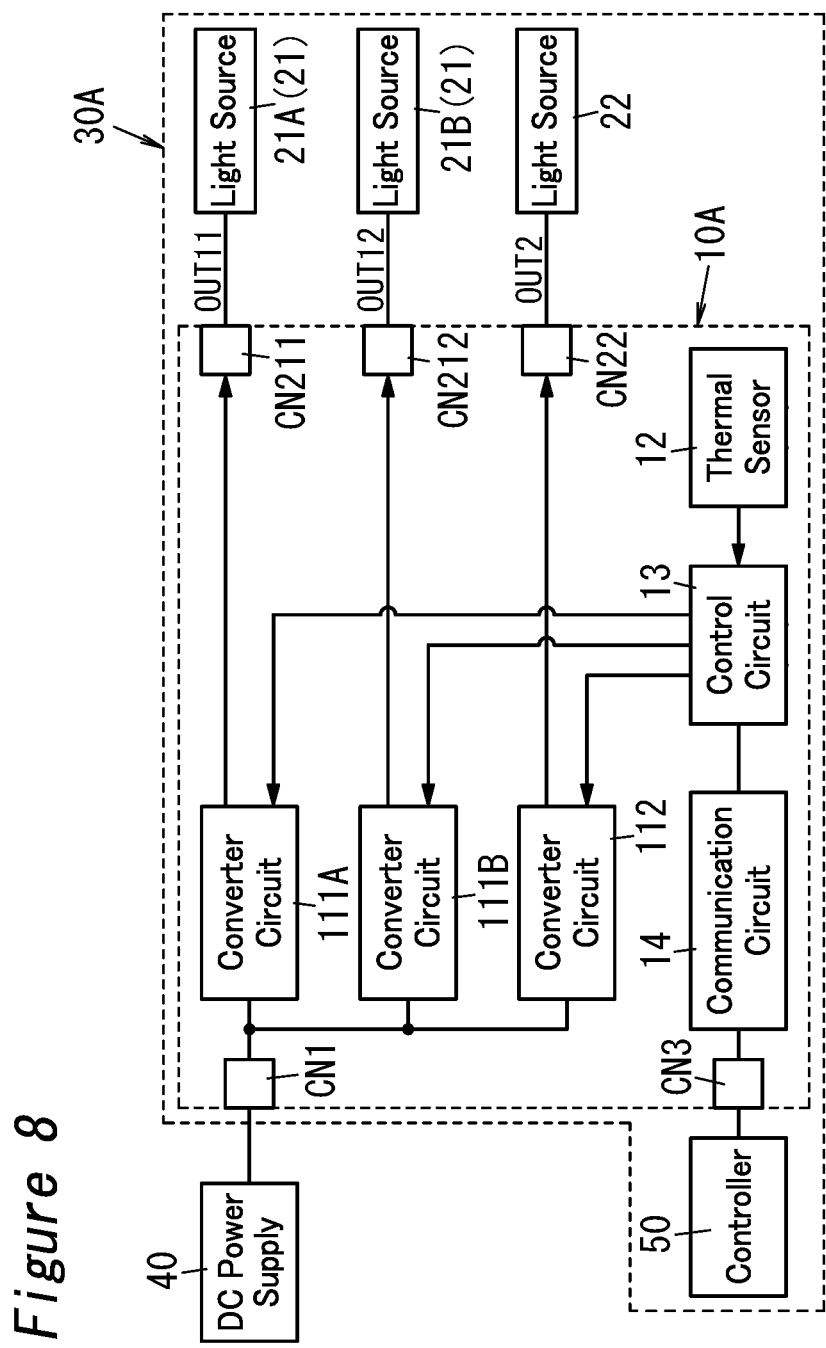
FIG. 8 is a block diagram of a lighting device in accordance with Embodiment 2.

Hereinafter, a lighting device 10A and a vehicle lighting system 30A equipped with the lighting device 10A, in accordance with Embodiment 2 will be explained with reference to FIG. 8.

The lighting device 10A according to the embodiment further includes a communication circuit 14 (an acquisition module) in addition to components that are the same as those of the lighting device 10 in the Embodiment 1. The lighting device 10A also includes converter circuits 111A and 111B in place of the converter circuit 111. The lighting device 10A also includes connectors CN211 and CN212 that allow light sources 21A and 21B to be respectively connected thereto, and a connector CN3 that allows communication wires, which is connected to a controller 50, to be connected thereto. The configuration except for the communication circuit 14, the converter circuits 111A and 111B, and the connectors CN211, CN212 and CN3 is the same as that of the lighting device 10 in the Embodiment 1, and therefore like components are assigned the same reference numerals as depicted in Embodiment 1 and description thereof has been omitted.

Preferably, the converter circuit 111A is a step-up DC-DC converter circuit. The converter circuit 111A may be configured to convert a DC voltage from a DC power supply 40 into an output (an output voltage or an output current) for the light sources 21A as a low-beam headlight to supply the light sources 21A with the output as an output OUT11 of the converter circuit 111A.

Preferably, the converter circuit 111B is a step-up DC-DC converter circuit. The converter circuit 111A may be configured to convert the DC voltage from the DC power supply 40 into an output (an output voltage or an output current) for the light sources 21B as a high-beam headlight to supply the light sources 21B with the output as an output OUT12 of the converter circuit 111B.

Preferably, the communication circuit 14 is configured to be connected to the controller 50 via the communication wires to be connected to the connector CN3. The controller 50 may be, for example a controller for performing overall control of a vehicle 60 (see FIG. 3) and the communication circuit 14 may be configured to acquire a vehicle information set from the controller 50. Examples of the vehicle information set include vehicle steering angle information, vehicle speed information, ambient illuminance information, vehicle body posture information and the like. The controller 50 may acquire the vehicle steering angle information from a sensor configured to detect (measure), for example a steering angle from a steering. The controller 50 may acquire the vehicle speed information from a sensor configured to detect (measure), for example revolutions (e.g., RPM: revolutions per minute) of a motor or an engine for rotating tires. The controller 50 may acquire the ambient illuminance information from, for example a brightness sensor (an illuminance meter) provided in the vehicle. The controller 50 may acquire the vehicle body posture information such as, for example an inclination of a vehicle body 61 from an acceleration sensor (accelerometer) provided in the vehicle.

Preferably, besides a first group of priorities as the priorities explained in Embodiment 1, the control circuit 13 has a second group of priorities (priority levels) that are provided to the different types of light sources 21A, 21B and 22 according to their respective types. For example, the second group of priorities is provided in order to decrease respective outputs of power converter circuits based on each information of the vehicle information set.

Preferably, the control circuit 13 is configured to control the respective outputs of the converter circuits 111A, 111B and 112 so as to decrease an output for a light source corresponding to a first priority (a highest priority) of the second group of priorities based on the vehicle information set acquired through the communication circuit 14. Specifically, the control circuit 13 may control the respective outputs of the converter circuits 111A, 111B and 112 so as to decrease the output for the light source corresponding to the first priority based on the vehicle information set regardless of an internal temperature detected with a thermal sensor 12. Note that like Embodiment 1, when the internal temperature detected with the thermal sensor 12 is greater than or equal to a threshold, the control circuit 13 may control the respective outputs of the power converter circuits so as to preferentially decrease an output for a light source corresponding to a first priority of the first group of priorities.

For example, when judging that the steering angle is greater than (greater than or equal to) a prescribed angle (e.g., 15 degrees or more) based on the vehicle steering angle contained in the vehicle information set, the control circuit 13 may judge that the vehicle 60 is turning a corner and then preferentially decrease the output OUT12 for the light sources 21B as the high-beam headlight. This example can suppress the decrease in the output OUT11 for the light sources 21A as the low-beam headlight and an output OUT2 for a light source 22 as a marker light, thereby preventing respective brightness of the low-beam headlight and the marker light from being dark.

For example, when judging that the speed of the vehicle is greater than (greater than or equal to) a prescribed speed (e.g., 30 km/h or more) based on the vehicle speed information contained in the vehicle information set, the control circuit 13 may preferentially decrease the output OUT11 for the light sources 21A as the low-beam headlight and the output OUT2 for the light source 22 as the marker light. This example can suppress the decrease in the output OUT12 for the light sources 21B as the high-beam headlight, thereby preventing the brightness of the high-beam headlight from being dark. Since it is possible to prevent the brightness of the high-beam headlight from being dark, a driver can therefore see well ahead of the vehicle when the speed of the vehicle is greater than (greater than or equal to) the prescribed speed.

For example, when the information that an ambient illuminance is darker than a prescribed illuminance is acquired from the ambient illuminance information contained in the vehicle information set, the control circuit 13 may preferentially decrease the output OUT2 for the light source 22 as the marker light or the like. This example can suppress the decrease in the output OUT11 for the light sources 21A as the low-beam headlight and the output OUT12 for the light sources 21B as the high-beam headlight, thereby preventing respective brightness of the low-beam headlight and the high-beam headlight from being dark. When the surroundings are dark, the light sources 21 as the headlights can be lit with the respective outputs OUT11 and OUT12 being not decreased. The driver can therefore recognize the presence of vehicles in front of the vehicle 60. Accordingly, even if the brightness of the light source 22 as the marker light or the like is decreased to a certain extent, the driving of the vehicle is hardly influenced thereby. That is, even if the brightness of the light source 22 as the marker light or the like is decreased to a certain extent, the bad influence on the driving of the vehicle can be decreased by suppressing the respective brightness of the light sources 21 as the headlights being dark.

For example, when the information that an inclination angle of the vehicle body 61 is larger than (larger than or equal to) a prescribed angle is acquired from the vehicle body posture information contained in the vehicle information set, the control circuit 13 may preferentially decrease the output OUT12 for the light sources 21B as the high-beam headlight and the output OUT2 for the light source 22 as the marker light. This example can suppress the decrease in the output OUT11 for the light sources 21A as the low-beam headlight. It is accordingly possible to suppress the brightness of the low-beam headlight being dark even when the vehicle body 61 is inclined with respect to a road surface, thereby facilitating checking the road surface state with eyes.

Note that the configuration (including the modified examples) explained in Embodiment 2 may be applied by being appropriately combined with the configuration (including the modified examples) explained in Embodiment 1. For example, the control circuit 13 may determine a light source, which the output for is decreased preferentially when the internal temperatures is greater than (greater than or equal to) a threshold, according to the second group of priorities based on each information of the vehicle information set acquired through the communication circuit 14 (the acquisition module). That is, the priorities explained in Embodiment 1 may be individually set in each of driving conditions.

As stated above, in the eighth aspect, the vehicle lighting system 30 further includes an acquisition module (communication circuit 14) configured to acquire a vehicle information set on driving conditions of the vehicle. The control circuit 13 has, as the priorities, a first group of priorities. The control circuit 13 further has a second group of priorities that are provided to the different types of light sources 21A, 21B and 22 according to their respective types. For example, the second group of priorities is provided in order to decrease the respective outputs of the power converter circuits based on an element of the vehicle information set. The control circuit 13 is configured to, based on at least one element of the vehicle information set acquired with the acquisition module, control respective outputs of the power converter circuits (converter circuits 111A, 111B and 112) so as to decrease an output, for a light source corresponding to a first priority (a high priority) of the second group based on the element, of the respective outputs of the power converter circuits (converter circuits 111A, 111B and 112). This configuration is hereinafter referred to as a "ninth aspect".

Thus, it is possible to decrease an output, for a light source corresponding to a first priority of the second group provided based on at least one element of the vehicle information set, of the respective outputs of the different types of light sources.

In the ninth aspect, the vehicle information set contains, as at least one element, at least one of vehicle steering angle information, vehicle speed information, ambient illuminance information and vehicle body posture information (a "tenth aspect").

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A lighting device, comprising:
a thermal sensor configured to measure an internal temperature of a case;
power converter circuits that are housed in the case and configured to be connected with different types of light sources, respectively; and
a control circuit that is housed in the case and configured to control respective outputs of the power converter circuits,
the control circuit having different priorities that are provided to the different types of light sources according to their respective types,
the control circuit being configured to, when the internal temperature measured with the thermal sensor is greater than a threshold, control the respective outputs of the power converter circuits so as to preferentially decrease the output with respect to one of the different types of light sources, which corresponds to a first priority, relative to the output of other of the different types of light sources, which correspond to a priority different from the first priority, wherein
the control circuit has respective thresholds that are provided to the different types of light sources so that respective temperatures of the thresholds are lower as respective light sources correspond to a higher priority, the control circuit being configured to decrease, when the internal temperature measured with the thermal sensor is greater than the respective thresholds, the output with respect to different types of light sources.

2. The lighting device of claim 1, wherein the priorities are provided to the different types of light sources based on both the respective types and their respective rated output currents.

3. The lighting device of claim 1, wherein each of the different types of light sources is a light emitting diode light source.

4. The lighting device of claim 1, wherein the control circuit is configured to, when the internal temperature measured with the thermal sensor is greater than or equal to the threshold, control the respective outputs of the power converter circuits so as to preferentially decrease the output with respect to the light source, which corresponds to the high priority, of the different types of light sources.

5. A vehicle lighting system, comprising:
the lighting device of claim 1;
the different types of light sources to be lit by the lighting device; and
a housing that holds the lighting device and at least one of the different types of light sources and is configured to be attached to a vehicle.

6. A lighting device, comprising:
a thermal sensor configured to measure an internal temperature of a case;
power converter circuits that are housed in the case and configured to be connected with different types of light sources, respectively; and
a control circuit that is housed in the case and configured to control respective outputs of the power converter circuits,
the control circuit having different priorities that are provided to the different types of light sources according to their respective types,
the control circuit being configured to, when the internal temperature measured with the thermal sensor is greater than a threshold, control the respective outputs of the power converter circuits so as to preferentially decrease the output with respect to one of the different types of light sources, which corresponds to a first priority, relative to the output of other of the different types of light sources, which correspond to a priority different from the first priority, wherein
a rate at which the control circuit decreases the respective electric power output to the different types of light sources, according to a rise in the internal temperature when the internal temperature measured with the thermal sensor is greater than the threshold, increases as the respective different types of light sources correspond to higher priority.

7. The lighting device of claim 6, wherein each of the different types of light sources is a light emitting diode light source.

8. The lighting device of claim 6, wherein the control circuit is configured to, when the internal temperature measured with the thermal sensor is greater than or equal to the threshold, control the respective outputs of the power converter circuits so as to preferentially decrease the output with respect to the light source, which corresponds to the high priority, of the different types of light sources.

9. A vehicle lighting system, comprising:
the lighting device of claim 6;
the different types of light sources to be lit by the lighting device; and
a housing that holds the lighting device and at least one of the different types of light sources and is configured to be attached to a vehicle.

10. A lighting device, comprising:
a thermal sensor configured to measure an internal temperature of a case;
power converter circuits that are housed in the case and configured to be connected with different types of light sources, respectively; and
a control circuit that is housed in the case and configured to control respective outputs of the power converter circuits,
the control circuit having different priorities that are provided to the different types of light sources according to their respective types,
the control circuit being configured to, when the internal temperature measured with the thermal sensor is greater than a threshold, control the respective outputs of the power converter circuits so as to preferentially decrease the output with respect to one of the different types of light sources, which corresponds to a first priority, relative to the output of other of the different types of light sources, which correspond to a priority different from the first priority, wherein
the control circuit has respective thresholds that are provided to the different types of light sources so that respective temperatures of the thresholds are lower as respective light sources correspond to a higher priority, the control circuit being configured to decrease, when the internal temperature measured with the thermal sensor is greater than the respective threshold, the output with respect to different types of light sources, and
a rate at which the control circuit decreases the respective electric power output to the different types of light sources, according to a rise in the internal temperature when the internal temperature measured with the thermal sensor is greater than the respective thresholds, increases as the respective different types of light sources correspond to higher priority.

11. The lighting device of claim 10, wherein each of the different types of light sources is a light emitting diode light source.

12. The lighting device of claim 10, wherein the control circuit is configured to, when the internal temperature measured with the thermal sensor is greater than or equal to the threshold, control the respective outputs of the power converter circuits so as to preferentially decrease the output with respect to the light source, which corresponds to the high priority, of the different types of light sources.

13. A vehicle lighting system, comprising:
the lighting device of claim 10;
the different types of light sources to be lit by the lighting device; and
a housing that holds the lighting device and at least one of the different types of light sources and is configured to be attached to a vehicle.

14. A lighting device, comprising:
a thermal sensor configured to measure an internal temperature of a case;
power converter circuits that are housed in the case and configured to be connected with different types of light sources, respectively; and
a control circuit that is housed in the case and configured to control respective outputs of the power converter circuits,
the control circuit having different priorities that are provided to the different types of light sources according to their respective types,
the control circuit being configured to, when the internal temperature measured with the thermal sensor is greater than a threshold, control the respective outputs of the power converter circuits so as to preferentially decrease the output with respect to one of the different types of light sources, which corresponds to a first priority, relative to the output of other of the different types of light sources, which correspond to a priority different from the first priority, wherein
the control circuit has different respective stop temperatures that are provided with respect to the different types of light sources and that are greater than the threshold, and
the control circuit is configured to, when the internal temperature measured with the thermal sensor is sequentially greater than the respective stop temperatures, control the respective outputs of the power converter circuits so as to stop respective outputs with respect to the different types of light sources in order of priority.

15. The lighting device of claim 14, wherein each of the different types of light sources is a light emitting diode light source.

16. The lighting device of claim 14, wherein the control circuit is configured to, when the internal temperature measured with the thermal sensor is greater than or equal to the threshold, control the respective outputs of the power converter circuits so as to preferentially decrease the output with respect to the light source, which corresponds to the high priority, of the different types of light sources.

17. A vehicle lighting system, comprising:
the lighting device of claim 14;
the different types of light sources to be lit by the lighting device; and
a housing that holds the lighting device and at least one of the different types of light sources and is configured to be attached to a vehicle.

18. A vehicle lighting system comprising: a lighting device; different types of light sources to be lit by the lighting device; and a housing that holds the lighting device and at least one of the different types of light sources and is configured to be attached to a vehicle, an acquisition module configured to acquire a vehicle information set on driving conditions of the vehicle, wherein the lighting device comprises a thermal sensor configured to measure an internal temperature of a case; power converter circuits that are housed in the case and configured to be connected with the different types of light sources, respectively; and a control circuit that is housed in the case and configured to control respective outputs of the power converter circuits, the control circuit having different priorities that are provided to the different types of light sources according to their respective types, and the control circuit being configured to, when the internal temperature measured with the thermal sensor is greater than a threshold, control the respective outputs of the power converter circuits so as to preferentially decrease the output with respect to one of the different types of light sources, which corresponds to a first priority, relative to the output of other of the different types of light sources, which correspond to a priority different from the first priority, the control circuit has, as the priorities, a first group of priorities, the control circuit further having a second group of priorities that are provided with respect to the different types of light sources according to their respective types, and the control circuit is configured to, based on at least one element of the vehicle information set acquired with the acquisition module, control respective outputs of the power converter circuits so as to decrease an output, for a light source corresponding to a first priority of the second group based on the element, of the respective outputs of the power converter circuits.

19. The vehicle lighting system of claim 18, wherein the vehicle information set contains, as said at least one element, at least one of vehicle steering angle information, vehicle speed information, ambient illuminance information and posture information of the vehicle.

* * * * *